US008255304B1

(12) United States Patent  
Lorenzo

(10) Patent No.: US 8,255,304 B1  
(45) Date of Patent: Aug. 28, 2012

(54) SYSTEMS AND METHODS FOR AUDIT CONFIRMATION AND OTHER CONFIRMATION SERVICES

(75) Inventor: David A. Lorenzo, Massapequa, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 639 days.

(21) Appl. No.: 12/399,469

(22) Filed: Mar. 6, 2009

Related U.S. Application Data

(60) Provisional application No. 61/034,390, filed on Mar. 6, 2008.

(51) Int. Cl.  
*G06Q 40/00* (2006.01)

(52) U.S. Cl. ............................................ 705/35; 705/38

(58) Field of Classification Search .................... 705/35, 705/38  
See application file for complete search history.

(56) References Cited

U.S. PATENT DOCUMENTS 7,383,232 B2 6/2008 Fox  
2004/0205030 A1* 10/2004 Fox ................................ 705/78

OTHER PUBLICATIONS

Deposit Account Verification Services | Citizens Bank No date.*

* cited by examiner

*Primary Examiner* — William Rankins  
(74) *Attorney, Agent, or Firm* — Goodwin Procter LLP

(57) ABSTRACT

Systems and methods for audit confirmation and other confirmation services by a financial institution are disclosed. In one particular exemplary embodiment, a computer-implemented method for automated confirmation services may comprise: receiving, by a financial institution and from a requestor, a confirmation request submitted in one or more standardized forms; parsing the standardized forms to identify: (a) an identity of the requestor, (b) an identity of an account holder whose financial data are sought, and (c) financial data fields sought by the confirmation request; determining whether the financial institution is authorized to respond to the confirmation request; retrieving the financial data from an account database based on the identified financial data fields; populating a response form with the retrieved financial data; affixing a proof mechanism to the response form for the financial institution to attest to the accuracy of the financial data; and making the response form available to the requestor.

22 Claims, 5 Drawing Sheets

Figure 4

STANDARD FORM TO CONFIRM ACCOUNT
BALANCE INFORMATION WITH FINANCIAL INSTITUTIONS

*YOUR COMPANY NAME HERE*

CUSTOMER NAME

Financial Institution's
Name and Address:

We have provided to our accountants the following information as of the close of business on DECEMBER 31, 2007, regarding our deposit and loan balances. Please confirm the accuracy of the information, noting any exceptions to the information provided. ( ... *additional instructions omitted* ... )

1. At the close of business on the date listed above, our records indicated the following deposit balance(s):

| ACCOUNT NAME | ACCOUNT NO. | INTEREST RATE | BALANCE* |
|---|---|---|---|
| General Account | 000123456 | | |
| | | | |

2. We were directly liable to the financial institution for loans at the close of business on the date listed above as follows:

| ACCOUNT NO./ DESCRIPTION | BALANCE* | DATE DUE | INTEREST RATE | DATE THROUGH WHICH INTEREST IS PAID | DESCRIPTION OF COLLATERAL |
|---|---|---|---|---|---|
| | | | | | |
| | | | | | |

_____     _____
(Customer's Authorized Signature)            (Date)

The information presented above by the customer is in agreement with our records. Although we have not conducted a comprehensive, detailed search of our records, no other deposit or loan accounts have come to our attention except as noted below.

_____     _____
(Financial Institution Authorized Signature)       (Date)

_____
(Title)

| EXCEPTIONS AND OR COMMENTS |
|---|
| |

Please fax and mail this confirm directly to our accountants:
Accountant's Address Here

Figure 5

**STANDARD FORM TO CONFIRM ACCOUNT
BALANCE INFORMATION WITH FINANCIAL INSTITUTIONS**

ID Field 1 → | ABC CORPORATION |

CUSTOMER NAME

Financial Institution's
Name and Address:   ID Field 2

Date Field 0

We have provided to our accountants the following information
as of the close of business on |DECEMBER 31, 2007| regarding
Address Field 2   our deposit and loan balances. Please confirm the accuracy of
the information, noting any exceptions to the information
provided. ( ... *additional instructions omitted* ...)

1. At the close of business on the date listed above, our records indicated the following deposit
balance(s):   Deposit Field 1-1    Deposit Field 1-2    Deposit Field 1-3    Deposit Field 1-4

| ACCOUNT NAME | ACCOUNT NO. | INTEREST RATE | BALANCE* |
|---|---|---|---|
| General Account | 000123456 | | |
| | | | |

Deposit Field 2-1    Deposit Field 2-2    Deposit Field 2-3    Deposit Field 2-4

2. We were directly liable to the financial institution for loans at the close of business on the date listed
above as follows:

| ACCOUNT NO./ DESCRIPTION | BALANCE* | DATE DUE | INTEREST RATE | DATE THROUGH WHICH INTEREST IS PAID | DESCRIPTION OF COLLATERAL |
|---|---|---|---|---|---|
| | | | | | |

Loan Field 1-1    Loan Field 1-2    Loan Field 1-3    Loan Field 1-4    Loan Field 1-5    Loan Field 1-6

Signature
Field 1   (Customer's Authorized Signature)   (Date)   Date Field 1

The information presented above by the customer is in agreement with our records. Although we have
not conducted a comprehensive, detailed search of our records, no other deposit or loan accounts have
come to our attention except as noted below.

Signature
Field 2
(Financial Institution Authorized Signature)   (Date)   Date Field 2

Signature
Field 2a
(Title)

| EXCEPTIONS AND OR COMMENTS |
|---|
| |

Notes Field 1

ID Field 3   Please fax and mail this confirm directly to our accountants:
Address Field 3   | Accountant's Address Here |

SYSTEMS AND METHODS FOR AUDIT CONFIRMATION AND OTHER CONFIRMATION SERVICES

CROSS-REFERENCE OF RELATED APPLICATIONS

This patent application claims priority to U.S. Provisional Patent Application No. 61/034,390, filed Mar. 6, 2008, which is incorporated by reference in its entirety.

FIELD OF THE INVENTION

The present invention relates generally to financial services. More particularly, the present invention relates to systems and methods for audit confirmation and other confirmation services by a financial institution.

BACKGROUND OF THE INVENTION

Financial institutions, such as banks, credit card issuers, and loan companies, routinely provide a wide range of confirmation services upon request. Typical confirmation services include, for example, audit confirmations, credit inquiries, deposit verifications, government address verifications, and verifications of financial account information for benefits eligibility. Table 1 below lists some typical confirmation services that may be offered by a financial institution and also provides a brief explanation of each service.

TABLE I

Typical Confirmation Services

| Confirmation Type | Information & Context |
| --- | --- |
| Audit Confirmation | request for account or loan balances from an accounting firm (or accountant) performing audit on a client's books |
| Credit Inquiry | request from a third-party vendor (e.g., credit card issuer) prior to extending credit to a customer |
| Verification of Deposit for Mortgages | request from a mortgage company to verify assets of a borrower |
| Personal Deposit Verification | request from a customer seeking proof of his or her balances and/or accounts |
| Government Address Verification | request from government to confirm a customer's mailing address |
| Account Verification for Immigration | request from a customer seeking proof of accounts for visa or immigration purposes |
| Consumer Request (for housing, Medicaid, social security, etc.) | request from government regarding a customer's account history to determine eligibility for housing, Medicaid, social security, or other government-sponsored aids and benefits |

By providing the various confirmation services, a financial institution not only supplies financial information as requested, but also signs off and attests to the accuracy of the data as a trusted party. With the large volumes of confirmation requests being processed on a routine basis, it is desirable to fulfill each of the confirmation requests efficiently and accurately without any compromise of privacy or security.

Currently, however, most audit confirmation and other confirmation services still rely on manual, paper-based processes that can be both inefficient and inaccurate. A manual process typically starts with a bank's receipt of audit confirmation requests via postal mail or facsimile. The bank's mailroom workers have to open, count and sort the request letters before routing them to appropriate departments for fulfillment. A group of bank employees, known as "confirmations specialists," have been specifically hired and trained to process the confirmation requests. A confirmations specialist needs to make a determination as to whether the bank is authorized and able to fulfill a particular request. If so, the confirmations specialist will look up the account data requested and fill in a response form or generate a response letter. The form or letter is then signed by a bank official and mailed or faxed back to the requestor. Several issues exist with this type of manual processes, such as inconsistent turnaround, multiple handoffs, lengthy processing cycle time, and lack of status information. Even assuming every step went smoothly, the manual fulfillment process would typically take a few days to complete. If any error or irregularity occurs during the process, it may take several days for a confirmation request to be fulfilled, if it is fulfilled at all. Requestors often become frustrated when they hear no response to their confirmation requests for weeks or end up receiving non-responsive or incorrect information, as it may hold up the requestors' ongoing work such as auditing or loan processing. Furthermore, the manual fulfillment process also present risks of data security as multiple paper copies are often generated for each confirmation request and may become misplaced or mishandled by the multiple bank employees involved in the manual process.

Capital Confirmation, Inc. (CCI) has attempted to streamline audit confirmation with a secure electronic intermediary service between a requestor (an auditor) and a responder (a financial institution). However, CCI has achieved very limited success because its technological and business solutions suffer from a number of shortcomings.

First, as a third-party intermediary, CCI does not own or have direct access to the financial data requested by auditors and therefore has to either rely on periodic data dumps from financial institutions or wait for the financial institutions to respond to individual data requests. CCI has to partner with a sufficient number of financial institutions in order to be able to timely respond to audit confirmations. For privacy and security concerns, it is impractical (and also costly) for banks to batch-export sensitive financial data to a third party's system such as CCI's. If CCI has to request individual pieces of data from the banks anyways, then, in terms of time and cost, it is hardly justifiable for the auditors to go through CCI rather than dealing with the banks directly. In any event, since CCI has no direct access to the source of financial data, CCI's solution cannot substantially affect, let alone improve, the confirmation process taking place within the banks.

Second, while CCI can relay financial data to the requestors, it is in no position to attest to the accuracy of the data. After all, it is the financial institutions maintaining the data who are the real trusted parties in the confirmation process. A bank can vouch for the veracity of financial information more confidently when the information is directly delivered to a requestor than when the information is relayed through a third party. The best CCI can do is to serve as an agent or proxy for auditors or accountholders.

Third, CCI's role as an intermediary among an auditor, an auditee (account holder), and the auditee's bank actually complicates the authentication and authorization procedures, at least from the bank's standpoint. Instead of receiving authorization directly from the bank's customer (account holder—auditee), the bank is obligated to take the extra step of determining whether requests relayed by CCI are fully authorized.

In view of the foregoing, it may be understood that there are significant problems and shortcomings associated with current confirmation services.

SUMMARY OF THE INVENTION

Systems and methods for audit confirmation and other confirmation services by a financial institution are disclosed.

In one particular exemplary embodiment, a computer-implemented system for automated confirmation services may comprise: a receiver module adapted to receive, by a financial institution and from a requestor, a confirmation request submitted in one or more standardized forms; a pre-processing module adapted to parse the one or more standardized forms to identify at least: (a) an identity of the requestor, (b) an identity of an account holder whose financial data are sought, and (c) financial data fields sought by the confirmation request; a security module adapted to determine whether the financial institution is authorized to respond to the confirmation request; an automated processing module adapted to retrieve the financial data from an account database based on the identified financial data fields; and an output module adapted to: populate a response form with the retrieved financial data, affix a proof mechanism to the response form for the financial institution to attest to the accuracy of the financial data, and make the response form available to the requestor.

In another particular exemplary embodiment, a computer-implemented system for automated confirmation services may comprise: a receiver module adapted to receive via a financial institution web portal a confirmation request submitted by a requestor, the confirmation request being in one or more standardized forms defined in one or more markup language templates; a pre-processing module adapted to parse the one or more standardized forms to identify at least: (a) an identity of the requestor, (b) an identity of an account holder whose financial data are sought, and (c) financial data fields sought by the confirmation request; a security module adapted to determine, by verifying a signature, an electronic permission, or a pre-authorization of the account holder, whether the financial institution is authorized to respond to the confirmation request; an automated processing module adapted to: validate the identified financial data fields, retrieve the financial data from an account database based on the identified financial data fields, reconcile data in the identified financial data fields with corresponding financial data in the account database, and generate a scripted note of exception if the data reconciliation reveals a substantial discrepancy; an output module adapted to: populate a response form with the retrieved financial data and the note of exception, if any, affix a proof mechanism to the response form for the financial institution to attest to the accuracy of the financial data, wherein the proof mechanism is selected from a group consisting of: an electronic signature, an electronic seal, an encrypted message, a watermark, a biometric symbol, and a security token, and make the response form available to the requestor via one or more channels selected from a group consisting of electronic mail, postal mail, facsimile, Internet download, online review, and instant messaging; and a workflow management module adapted to track a fulfillment of the confirmation request in an electronic log that can be queried for a current status of the fulfillment.

In yet another particular exemplary embodiment, a computer readable medium storing computer executable codes for causing at least one processor to provide automated confirmation services may comprise: computer executable code adapted to receive, by a financial institution and from a requestor, a confirmation request submitted in one or more standardized forms; computer executable code adapted to parse the one or more standardized forms to identify at least: (a) an identity of the requestor, (b) an identity of an account holder whose financial data are sought, and (c) financial data fields sought by the confirmation request; computer executable code adapted to determine whether the financial institution is authorized to respond to the confirmation request; computer executable code adapted to retrieve the financial data from an account database based on the identified financial data fields; computer executable code adapted to populate a response form with the retrieved financial data; computer executable code adapted to affix a proof mechanism to the response form for the financial institution to attest to the accuracy of the financial data; and computer executable code adapted to make the response form available to the requestor.

In still another particular exemplary embodiment, a computer-implemented method for automated confirmation services may comprise: receiving, by a financial institution and from a requestor, a confirmation request submitted in one or more standardized forms; parsing, by one or more computers, the one or more standardized forms to identify at least: (a) an identity of the requestor, (b) an identity of an account holder whose financial data are sought, and (c) financial data fields sought by the confirmation request: determining, by the one or more computers, whether the financial institution is authorized to respond to the confirmation request; retrieving the financial data from an account database based on the identified financial data fields; populating, by the one or more computers, a response form with the retrieved financial data; affixing a proof mechanism to the response form for the financial institution to attest to the accuracy of the financial data; and making the response form available to the requestor.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to Facilitate a fuller understanding of the present invention, reference is now made to the accompanying drawings, in which like elements are referenced with like numerals. These drawings should not be construed as limiting the present invention, but are intended to be exemplary only.

FIG. 4 shows a typical audit confirmation request form in accordance with an embodiment of the present invention.

FIG. 5 shows exemplary data fields in a typical audit confirmation request form in accordance with an embodiment of the present invention.

DETAILED DESCRIPTION OF THE INVENTION

Embodiments of the present invention provide for confirmation services techniques to substantially automate and streamline what used to be a manual, time-consuming, and inefficient process. The confirmation services techniques disclosed herein may be implemented in a number of ways and may offer several advantages over existing audit confirmation methods, as will be described in detail below.

Figure 1:
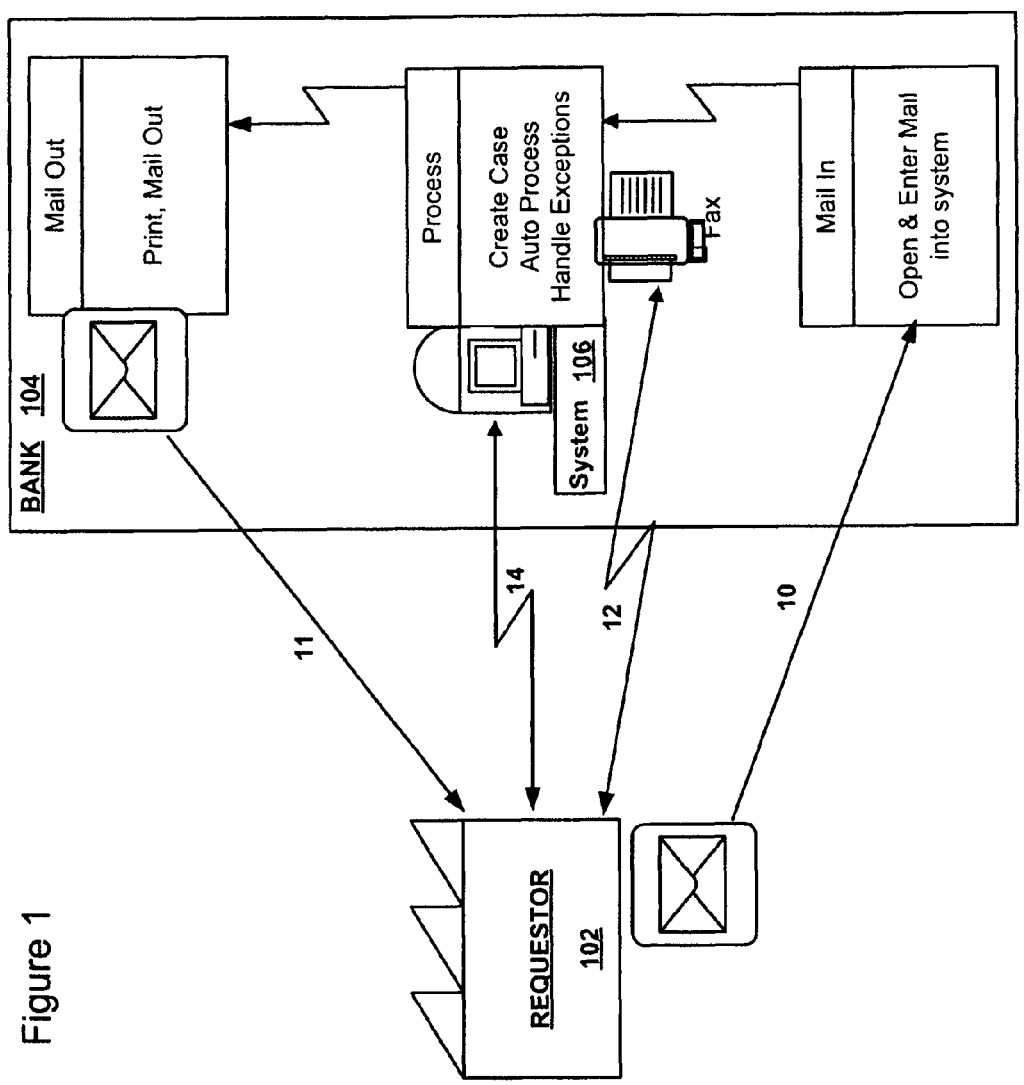
FIG. 1 shows a block diagram illustrating an exemplary method of automated confirmation services in accordance with an embodiment of the present invention.

Referring to FIG. 1, there is shown a block diagram illustrating an exemplary method of automated confirmation services in accordance with an embodiment of the present invention. As a general overview, FIG. 1 shows typical communication channels that a requestor 102 might employ to submit confirmation requests to a bank 104. FIG. 1 also illustrates, on a high level, how the bank 104 may process and respond to the confirmation requests from the requestor 102.

The confirmation requests may be of any type such as, for example, audit confirmation, credit inquiry, verification of deposit for mortgages, personal deposit verification, government address verification, account verification for immigration, and financial verification for aids or benefits eligibility. Accordingly, the requestor 102 may be an accountant or a group of accountants, an accounting firm, a credit card issuer, a loan officer, a mortgage lender or servicer, an individual consumer, or a government entity. Although referred to herein as a "bank" for ease of illustration, the bank 104 may be any type of financial institution that is capable of serving as a trusted party to provide confirmation or verification of financial information, which may be, for example, a consumer bank, a commercial bank or investment bank, a credit card company, a mortgage company, an investment (or fund) management company. The information sought by the confirmation requests typically includes financial data associated with customer accounts held at the bank 104. The customer accounts may include, but are not limited to, deposit accounts (e.g., checking or savings accounts), money market accounts, credit card accounts, loan accounts (e.g., mortgage loans or personal loans), and sweep accounts.

While, currently, the most common communication channels for the requestor 102 to submit confirmation requests are postal mail (10) and fax (12), a preferred channel according to embodiments of the present invention is a computer and communication interface (14). Preferably, the requestor 102 will electronically submit one or more confirmation requests to the bank 104 via, for example, a secure web portal or electronic mail. The confirmation requests are preferably presented in one or more standardized forms or templates. The bank 104's processing system 106 may then create a case for each confirmation request (or each batch of related requests), fulfill the request(s) via an automated data retrieval and verification process, handle exceptions revealed during fulfillment, and respond to the requestor 102 via any of the communication channels (11, 12, or 14).

If the confirmation requests were submitted by mail (10) or fax (12), typically also in a standard request form, the request form may first be converted to electronic images or other machine-recognizable format, and relevant data may then be extracted from the converted forms. Next, the extracted data may be processed by the bank's automated system 106 to fulfill the confirmation requests.

Figure 2:
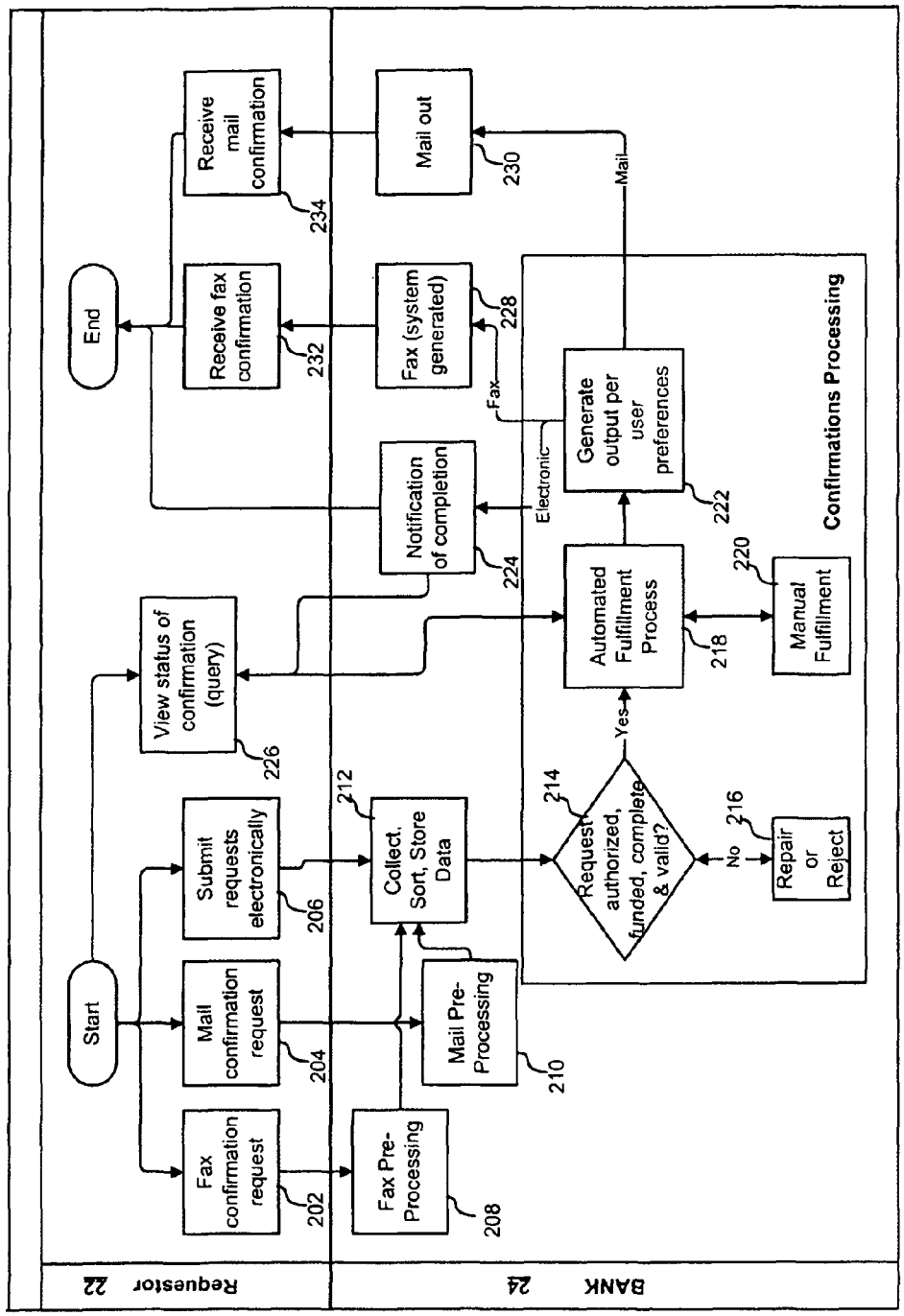
FIG. 2 shows a flow chart illustrating an exemplary process of automated confirmation services in accordance with an embodiment of the present invention.

FIG. 2 shows a flow chart illustrating an exemplary process of automated confirmation services in accordance with an embodiment of the present invention.

The exemplary process may start with a Requestor 22 submitting a confirmation request to a Bank 24. For ease of illustration and as one example, it is assumed that Requestor 22 is an accounting firm in the process of auditing financial statements of a client company, and the client company maintains deposit accounts and/or loan accounts with Bank 24. Thus, the confirmation request submitted may be in the form of an audit confirmation letter.

Requestor 22 may fax the confirmation request (step 202), mail the confirmation request (step 204), or preferably submit the request electronically (step 206) to Bank 24.

If submitted via fax or by mail, the confirmation request is preferably in a standardize format. One typical format of audit confirmation letter is shown in FIG. 4. The letter is entitled "Standard Form to Confirm Account Balance Information with Financial Institutions" and is of a format approved by American Bankers Association (ABA), American Institute of Certified Public Accountants (AICPA), and Bank Administration Institute (BAI). For efficiency of data processing, it is desirable that the confirmation request form, regardless of how it is submitted, conform with at least one of the industry-standard formats approved or recommended by organizations such as ABA, AICPA or BAI. The form shown in FIG. 4 identifies the company ("ABC Corporation") that is being audited and presents two categories of financial information to be confirmed or supplied by a financial institution. The first category includes deposit account information and the second category includes loan account information, both of a specified date (e.g., Dec. 31, 2007). There is also provided an "Exceptions and/or Comments" field for Bank 24 to note any error or discrepancy in the financial data. Submitted in paper form (i.e., by fax or mail), the request form may already bear an authorized signature (or seal) of the auditee (account holder) or other indication of authorization for Bank 24 to release the auditee's financial information.

In step 208, Bank 24 may pre-process the request form that has been submitted via fax. Depending on how the fax is received (e.g., via Internet versus via telephone line), the request form may be already in a computer-recognizable image (or PDF) format or may be scanned or otherwise converted to such format. Then, an optical character recognition (OCR) or similar text recognition procedure may be applied to the converted request form in order to extract relevant data and store the data electronically. Since the request form should be in one of a limited number of standard formats, a form field recognition and data extraction may be performed based on known templates that reflect the data structure of the standard forms. Similarly, in step 210, Bank 24 may pre-process the request form that has been mailed in. The paper-based request form may be scanned and then OCR'd to extract relevant data. In steps 208 and 210, the original image of the request form may be preserved and the relevant data fields may be tagged if Bank 24 needs to enter data into the original form later on.

According to a preferred embodiment of the present invention, the confirmation request may be submitted electronically (step 206). According to one embodiment, a secure website may be set up for Requestor 22 to log in and enter confirmation requests either via an interactive user interface or by uploading electronic request forms. The website may be a standalone web portal that specifically serves the purpose of receiving confirmation requests. Alternatively or additionally, the request-receiving functions may be incorporated Bank 24's existing online banking portal. For example, a customer of Bank 24 may request confirmation services after logging into his or her online banking webpages. The customer may also pre-authorize and/or pre-schedule confirmation requests by specifying, for example, an identity of a requestor, a scope of financial information to be disclosed to each requestor, and a date or date range during which the pre-authorization is granted. The pre-authorization may remain on file with Bank 24 such that it becomes unnecessary to seek authorization from the customer for each upcoming confirmation request. One advantage of receiving confirmation requests from a secure web portal is that frequent requestors may be pre-screened and pre-qualified based at least in part on their known business relations with Bank 24's account holders or according to account holders' pre-authorization.

Apart from the online submission via a website, the confirmation request may also be submitted via encrypted electronic mail (e.g., with tamper-proof electronic signature or security token), through secure file transfer (FTP), or by any other electronic means.

Next, in step 212, Bank 24 may collect, sort and store the electronically submitted confirmation request (and related data) as well as pre-processed data related to the requests submitted by mail or fax.

In step 214, it may be determined, based on the pre-processed data and other information Bank 24 might have, whether the confirmation request is authorized, funded, complete and valid. That is, Bank 24 needs to make sure that: (1) an account holder has properly given permission for the requested financial information to be released; (2) Bank 24 has been paid or promised a fee payment for fulfilling the confirmation request; (3) all the pieces of information have been submitted to enable Bank 24 to proceed with the confirmation (e.g., name, account number, and/or Tax ID of the account holder whose financial data are sought, and the type of financial data sought by the confirmation request); (4) the data in the confirmation request are valid (e.g., conform to known format).

If it is determined in step 214 that the confirmation request is not authorized, funded, complete or valid, an error may be noted and Bank 24 may attempt to repair the confirmation request or simply reject the request in step 216. Requestor 22 may be notified of the error and given an opportunity to revise and re-submit the confirmation request. If it is determined in step 214 that the confirmation request is authorized, funded, complete and valid, an automated fulfillment process may be initiated in step 218 to identify an account database, retrieve and/or calculate the financial account data sought by the confirmation request, and verify the accuracy of the account data. In a small number of instances, the account data may be too complicated or there may be irregularities in the account data, which may require a limited amount of manual processing in step 220. In most instances, the automated fulfillment process is expected to successfully retrieve and verify the requested data.

Then, in step 222, output may be generated based upon user preferences. Requestor 22 (or account holder) may have indicated to Bank 24 the preferred output format and communication channel for receiving confirmation responses. Typically, Bank 24 may generate an electronic response form in a same or similar format as the request form and cause relevant data fields in the electronic response form to be automatically populated with the financial data that have been retrieved and verified in step 218. Bank 24 may also cause one or more proof mechanism to be affixed to the electronic response form or any physical medium thereof, where the proof mechanism may serve as Bank 24's attestation of data accuracy and may further prevent tampering of the response form. The proof mechanism may include, for example, an electronic signature, an electronic seal, an encrypted message, a watermark, a biometric symbol, and/or a security token.

According to some embodiments of the present invention, an electronic notification (e.g., via email, instant message or automated phone call) may be sent to Requestor 22 (and/or the account holder) in step 224. The electronic notification may inform Requestor 22 of the completion of the confirmation response or alert Requestor 22 of any issues or current status of the fulfillment process. Requestor 22 may also log into a secure website to view the current status of the confirmation fulfillment in step 226 and, if the response has been completed, be given an opportunity to review online and/or download the response form or confirmation letter.

If the user preference is to receive the confirmation response by fax or mail, a computer-generated fax or letter may be prepared and sent out (step 228 or step 230). If a number of confirmation responses are fulfilled within a short time period for the same Requestor 22, those responses may be batched into a smaller number of fax or mail pieces. Requestor 22 may then receive the confirmation response by fax (step 232) or by mail (step 234). Regardless of the communication channel through which Requestor 22 receives the confirmation response, Requestor 22 may still be given the option of accessing a copy of the response online to review or download.

At least some of the method steps as illustrated in FIG. 2 may be implemented with computer software. According to some embodiments of the present invention, a computer readable medium may be encoded with program instructions that can cause a computer processor and related hardware and software to perform some or all of the confirmation services such as receiving requests, pre-processing, data validation, data retrieval and verification, and output generation. For different financial institutions and requestors, the program instructions (e.g., accounts and other data formats and user interfaces) may be customized or adapted according to the specific hardware and software with which the program instructions need to interact or interoperate.

Figure 3:
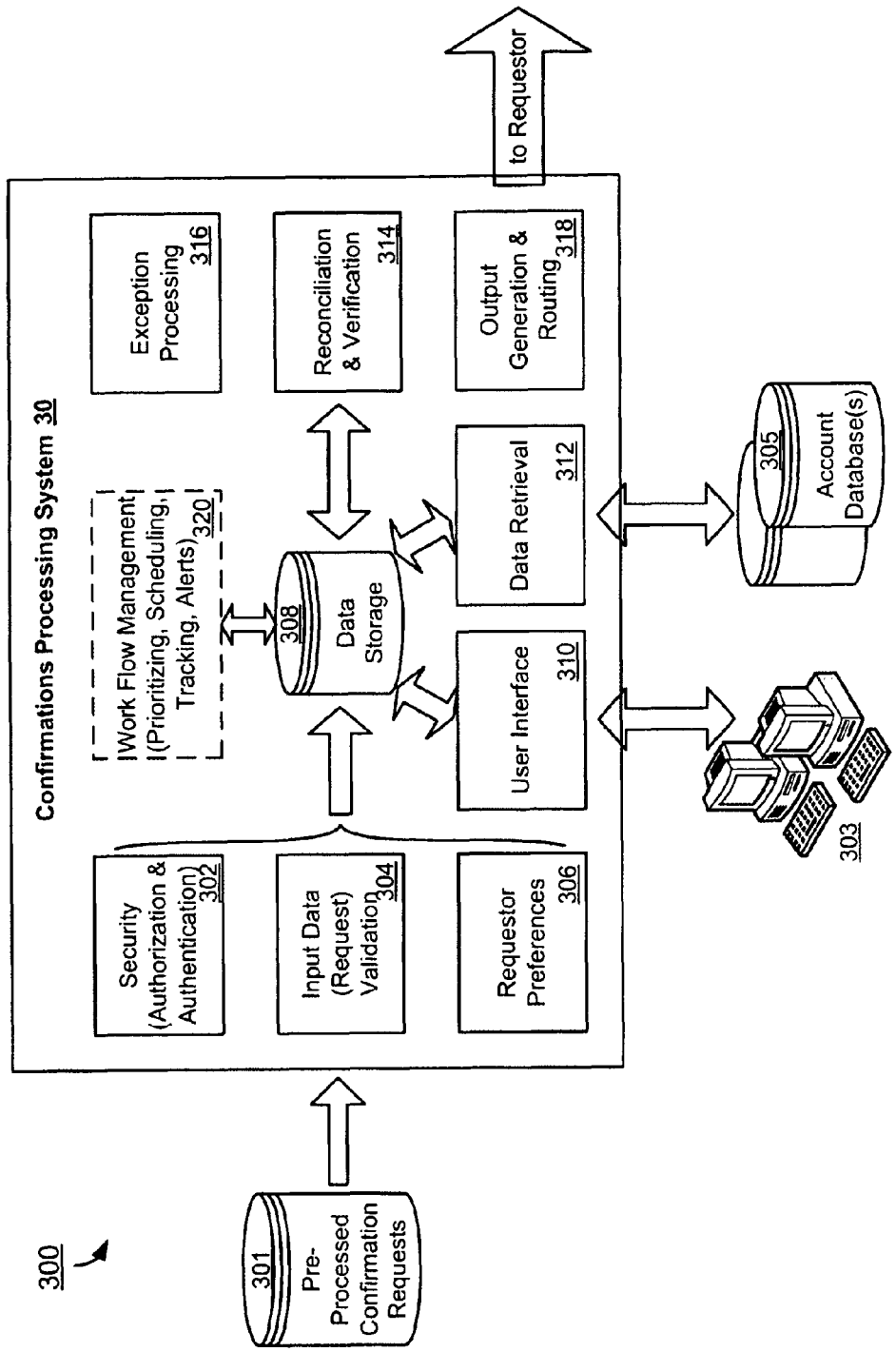
FIG. 3 shows a block diagram illustrating an exemplary system of automated confirmation services in accordance with an embodiment of the present invention.

FIG. 3 shows a block diagram illustrating an exemplary system 300 of automated confirmation services in accordance with an embodiment of the present invention.

The system 300 may be or include a computer system. This embodiment of the present invention may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or personal digital assistants (PDAs), multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system 600 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/non-removable, volatile/nonvolatile computer storage media. For example, a hard disk drive may read or write to non-removable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

More specifically, the system 300 may comprise a confirmations processing system 30 consisting of a number of interconnected function modules that include or are coupled to a plurality of databases or data sources. The functions of these modules may be carried out in individual hardware units and/or as software modules whose instructions are executed on one or more data processors. The processing system 30 may comprise one or more user interfaces 310 accessible by one or more terminals 303 for local or remote access to the functionalities of the data processor(s) and the information in the databases or data sources.

The system 300 may be operated by or for a financial institution to respond to confirmation requests it receives. The processing system 30 may receive as input pre-processed confirmation request data from a database 301. The pre-processed data may be utilized by at least a security module 302, a validation module 304, and a requestor preferences module 306, respectively.

The security module 302 may authenticate a requestor and determine whether the system 30 has sufficient authority to process a request. The authentication may involve identifying an origin of the confirmation request (e.g., telephone number from which a request was faxed, email address from which the request was forwarded), validating any security token or timestamp on the confirmation request, comparing signature exemplars or biometric samples, or through other means to confirm whether the requestor is the entity it purports to be. If the confirmation request has been submitted via a secure web portal by a registered user, the authentication of the requestor may have already been confirmed based on the user's login credentials. The determination of proper authorization may involve identifying the account holder whose information is sought and verifying any prior or current permissions given by the account holder. The permissions may be in the form of a physical signature or seal on the request form, a digital signature or the like embedded in an electronic request form, or a prior authorization on record. Other authentication or authorization techniques may also be employed by the security module 302, by itself or in cooperation with other mechanisms.

The validation module 304 may examine data fields of the request form to determine whether each field is recognizable or conforms with a known type and format. As briefly mentioned earlier, the request form is preferably in a standardized format in which each data field may be predefined according to industry conventions or standards. In fact, the request form may be structured as or generated from one or more markup language templates. For example, the Extensible Markup Language (XML) may be one type of markup language suitable for structuring or generating a standardized request form. FIG. 5 shows exemplary data fields in a typical audit confirmation request form in accordance with an embodiment of the present invention. The audit confirmation request form is the same as the standard form shown in FIG. 4. As shown, there are a number of data fields that are of relevance to the audit confirmation process, such as ID Fields 1-3 (identifying the account holder, financial institution, and requestor), Date Field 0 (the date as of which the financial data are needed), various Deposit Fields (deposit account names, numbers, interest rates, and balances), and various Loan Fields (information on account holder's direct liability to the financial institution). These data fields may be specifically defined in an XML template or the like and be correlated with data fields in one or more account databases 305.

According to some embodiments of the present invention, a graphical user interface (GUI) may display any of a number of confirmation request forms, preferably with interactive features. For example, the various data fields, such as account and loan information fields, may be implemented as pull-down menus or other user-friendly and user-selectable mechanisms. The account fields may include one or more drop-down menus indicating account types (e.g., DDA account, money market account, investment fund or brokerage account) and providing descriptive information thereof. The loan fields may provide selections among, for instance, commercial mortgage, commercial bank loan, private bank loan, and consumer loan (e.g., residential mortgage or car loan). As a result, a requestor may easily and accurately formulate and submit a confirmation request via the GUI. A bank operator may also use the GUI to review submitted requests and make corrections where necessary.

The requestor preferences module 306 may recognize and record data that indicate one or more preferences expressed in the confirmation request or identify requestor preferences already stored in or available to the system 30. Typical requestor preferences may include, for example, the output format of confirmation response, channels of communications, frequency and level of status updates, and due date or deadline by which to receive a completed response.

Once the confirmation request has been cleared for security, the input data have been validated, and the requestor preferences have been confirmed, the resultant or intermediate data may be stored in a Data Storage module 308. A Reconciliation & Verification module 314 may cause a Data Retrieval module 312 to query Account Database(s) 305 to fetch account data needed for confirmation fulfillment. Since account data fields in the Account Database(s) 305 have been correlated with the data fields in the standard request form templates, the account data may be quickly retrieved based on the validated input data from the request form. The account data retrieved may also be stored in the Data Storage module 308. In some instances, the retrieve account data may undergo some calculation or processing to generate the exact type of statistic values sought in the confirmation request. The Reconciliation & Verification module 314 may then compare the retrieved (and/or processed) account data with data fields of the request form. If the comparison confirms a match within a tolerance, the corresponding data field may be marked as verified. If the comparison reveals substantial differences, the corresponding data field may be marked for an exception and may be further examined by an Exception Processing module 316. Some of the data fields in the request form may have been left blank, and, in that case, the Exception Processing module 316 (or the Reconciliation & Verification module 314) may cause those blank fields to be populated with financial data that have been retrieved from the Account Database(s) 305. It should be noted that the Account Database(s) 305 may be or include one or more data sources situated locally or remotely from the system 30, and the data sources may belong to the financial institution implementing the system 30 or another organization.

An Output Generation & Routing module 318 may populate a standard or customized response form with the verified financial data including any exceptions or comments and generate the response form in electronic format (e.g., TIF, PDF), as a fax image, and/or as a letter, all according to requestor preferences. The response form so generated may then be automatically routed via a proper channel to be made available to the requestor.

According to embodiments of the present invention, it may be desirable for the requestor to authenticate the confirmation response from the bank as well, that is, to be sure the confirmation response actually comes from the bank and has not been tampered with. On the bank's end, a number of tamper-proof mechanisms may be attached to or embedded in the confirmation response form or data. For example, if a confirmation response is delivered in electronic format, a checksum value (or hash value) may be generated from the electronic data representing the confirmation response and that value may be delivered to the requestor via a separated communication channel. For another example, a tamper-proof signature, seal, watermark, or other insignia may be combined with the confirmation response form or data before delivery to the requestor. Alternatively, a passcode or PIN number only known to the bank and the requestor may be used to encrypt a confirmation request. Numerous other mechanisms exist for a requestor to authenticate a confirmation response.

The system 30 may further comprise a Work Flow Management module 320 that may be in communication with the other modules to monitor the fulfillment process of confirmation requests. For example, the Work Flow Management module 320 may prioritize confirmation requests, schedule the processing of the requests, track the fulfillment status of each request, and generate alerts or status updates based on the fulfillment progress. System operators and/or requestors may be able to make status queries or be notified of the status of each confirmation case that is in the pipeline.

According to further embodiments of the present invention, system 30 may also include a Fee Management Module (not shown) which keeps track of fee payments from requestors and/or accountholders for the confirmation services. The Fee Management Module may verify whether a proper fee has been paid or promised for a particular confirmation request before giving a green light for the fulfillment of that particular request to proceed in the system 30. The Fee Management Module may also issue alert messages to a requestor or accountholder, for example, if a fee is due or if an overdue payment is holding up a confirmation request.

It should be noted that, while the confirmation services techniques in accordance with the present invention have been described mostly in the context of audit confirmation and with respect to auditors and banks, the present invention is not limited to audit confirmations or the specific types of entities described above. In fact, the automated confirmation systems and methods may be adapted to provide a wide range of confirmation services among different types of entities.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A computer-implemented system for automated confirmation services, the system comprising:
  at least one computer comprising a processor and a memory, the at least one computer programmed for executing instructions to perform one or more steps including
  receiving, by a financial institution and from a requestor, a confirmation request submitted in one or more standardized forms;
  parsing the one or more standardized forms to identify at least: (a) an identity of the requestor, (b) an identity of an account holder whose financial data are sought, and (c) financial data fields sought by the confirmation request;
  determining whether the financial institution is authorized to respond to the confirmation request;
  retrieving the financial data from an account database based on the identified financial data fields; and
  generating an output by
    populating a response form with the retrieved financial data,
    affixing a proof mechanism to the response form for the financial institution to attest to the accuracy of the financial data, and
    making the response form available to the requestor.

2. A computer-implemented system for automated confirmation services, the system comprising:
  at least one computer comprising a processor and a memory, the at least one computer programmed for executing instructions to perform one or more steps including
  receiving via a financial institution web portal a confirmation request submitted by a requestor, the confirmation request being in one or more standardized forms defined in one or more markup language templates;
  parsing the one or more standardized forms to identify at least: (a) an identity of the requestor, (b) an identity of an account holder whose financial data are sought, and (c) financial data fields sought by the confirmation request;
  determining, by verifying a signature, an electronic permission, or a pre-authorization of the account holder, whether the financial institution is authorized to respond to the confirmation request;
  performing automated processing by:
    validating the identified financial data fields,
    retrieving the financial data from an account database based on the identified financial data fields,
    reconciling data in the identified financial data fields with corresponding financial data in the account database, and
    generating a scripted note of exception if the data reconciliation reveals a substantial discrepancy;
  generating an output by:
    populating a response form with the retrieved financial data and the note of exception, if any,
    affixing a proof mechanism to the response form for the financial institution to attest to the accuracy of the financial data, wherein the proof mechanism is selected from a group consisting of: an electronic signature, an electronic seal, an encrypted message, a watermark, a biometric symbol, and a security token, and
    making the response form available to the requestor via one or more channels selected from a group consisting of: electronic mail, postal mail, facsimile, Internet download, online review, and instant messaging; and
  tracking a fulfillment of the confirmation request in an electronic log that can be queried for a current status of the fulfillment.

3. A non-transitory computer readable medium storing computer executable codes for causing at least one processor to provide automated confirmation services, the computer readable medium comprising:
  computer executable code adapted to receive, by a financial institution and from a requestor, a confirmation request submitted in one or more standardized forms;
  computer executable code adapted to parse the one or more standardized forms to identify at least: (a) an identity of the requestor, (b) an identity of an account holder whose financial data are sought, and (c) financial data fields sought by the confirmation request;
  computer executable code adapted to determine whether the financial institution is authorized to respond to the confirmation request;
  computer executable code adapted to retrieve the financial data from an account database based on the identified financial data fields;

computer executable code adapted to populate a response form with the retrieved financial data;

computer executable code adapted to affix a proof mechanism to the response form for the financial institution to attest to the accuracy of the financial data; and computer executable code adapted to make the response form available to the requestor.

4. A computer-implemented method for automated confirmation services, the method comprising:

receiving, by a financial institution and from a requestor, a confirmation request submitted in one or more standardized forms;

parsing the one or more standardized forms to identify at least: (a) an identity of the requestor, (b) an identity of an account holder whose financial data are sought, and (c) financial data fields sought by the confirmation request;

determining whether the financial institution is authorized to respond to the confirmation request;

retrieving the financial data from an account database based on the identified financial data fields;

populating a response form with the retrieved financial data;

affixing a proof mechanism to the response form for the financial institution to attest to the accuracy of the financial data; and making the response form available to the requestor;

wherein at least the parsing, determining, retrieving, and populating steps are performed by a computer comprising a processor and a memory.

5. The method according to claim 4, further comprising:
defining the one or more standardized forms in one or more markup language templates.

6. The method according to claim 4, further comprising:
receiving the confirmation request in an electronic format via a web portal.

7. The method according to claim 4, wherein the confirmation request is submitted in paper form, and the method further comprising:
performing optical character recognition to extract data from the confirmation request.

8. The method according to claim 4, further comprising:
validating, by the one or more computers, the financial data fields to determine whether there is sufficient information for the financial institution to fulfill the confirmation request.

9. The method according to claim 4, further comprising:
facilitating account holders' pre-authorization of confirmation requests; and
determining, based on the pre-authorization, whether the financial institution is authorized to respond to the confirmation request.

10. The method according to claim 9, wherein the pre-authorization comprises one of more parameters selected from a group consisting of: (a) an identity of a requestor; (b) a scope of financial information to be disclosed to each requestor; and (c) a date or date range during which the pre-authorization is granted.

11. The method according to claim 9, further comprising:
pre-generating the response form based on the pre-authorization by the account holder; and
reconfiguring the pre-generated response form based on the identified financial data fields.

12. The method according to claim 4, further comprising:
identifying the account database based on the identity of the account holder and the identified financial data fields; and
reconciling data in the identified financial data fields with corresponding financial data in the account database.

13. The method according to claim 12, further comprising:
generating a scripted note of exception if the data reconciliation reveals a substantial discrepancy; and
including the note of exception in the response form.

14. The method according to claim 4, further comprising:
tracking a fulfillment of the confirmation request in an electronic log that can be queried for a current status of the fulfillment.

15. The method according to claim 14, further comprising:
issuing an alert message, based on the current status of the fulfillment, to at least one of: the requestor, the account holder, and the financial institution.

16. The method according to claim 4, further comprising:
managing fulfillment workflow of a plurality of confirmation requests; and
prioritizing the fulfillment of the plurality of confirmation requests.

17. The method according to claim 4, further comprising:
receiving a plurality of confirmation requests from the requestor; and
batch-processing the plurality of confirmation requests.

18. The method according to claim 4, wherein the proof mechanism is selected from a group consisting of:
an electronic signature;
an electronic seal;
an encrypted message;
a watermark;
a biometric symbol; and
a security token.

19. The method according to claim 4, wherein the confirmation request is for one or more confirmation services selected from a group consisting of:
audit confirmation;
credit inquiry;
verification of deposit for mortgages;
personal deposit verification;
government address verification;
account verification for immigration; and
financial verification for aids or benefits eligibility.

20. The method according to claim 4, wherein the one or more standardized forms are in a format approved by at least one of: American Bankers Association, American Institute of Certified Public Accountants, and Bank Administration Institute.

21. The method according to claim 4, wherein the response form is defined in one or more markup language templates.

22. The method according to claim 4, wherein the response form is made available to the requestor via one or more channels selected from a group consisting of: electronic mail, postal mail, facsimile, Internet download, online review, and instant messaging.

* * * * *